United States Patent
Vishin

(10) Patent No.: US 7,774,549 B2
(45) Date of Patent: Aug. 10, 2010

(54) HORIZONTALLY-SHARED CACHE VICTIMS IN MULTIPLE CORE PROCESSORS

(75) Inventor: Sanjay Vishin, Sunnyvale, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 624 days.

(21) Appl. No.: 11/681,610

(22) Filed: Mar. 2, 2007

(65) Prior Publication Data

US 2008/0091880 A1 Apr. 17, 2008

Related U.S. Application Data

(60) Provisional application No. 60/829,099, filed on Oct. 11, 2006.

(51) Int. Cl.
G06F 12/12 (2006.01)
G06F 13/00 (2006.01)

(52) U.S. Cl. .................. 711/133; 711/122; 711/146; 711/E12.023; 711/E12.07

(58) Field of Classification Search ................ 711/119, 711/122, 133, E12.023, E12.069, E12.07
See application file for complete search history.

(56) References Cited

U.S. PATENT DOCUMENTS

| | | | | |
|---|---|---|---|---|
| 5,854,929 | A * | 12/1998 | Van Praet et al. | 717/156 |
| 6,266,742 | B1 * | 7/2001 | Challenger et al. | 711/133 |
| 6,449,671 | B1 * | 9/2002 | Patkar et al. | 711/E12.023 |
| 2003/0046493 | A1 * | 3/2003 | Coulson | 711/118 |
| 2004/0030843 | A1 * | 2/2004 | Arimilli et al. | 711/146 |
| 2004/0111566 | A1 * | 6/2004 | Edirisooriya et al. | 711/146 |
| 2004/0260880 | A1 * | 12/2004 | Shannon et al. | 711/122 |
| 2006/0184742 | A1 * | 8/2006 | Clark et al. | 711/133 |

* cited by examiner

*Primary Examiner*—Hetul Patel
*Assistant Examiner*—Michael C Krofcheck
(74) *Attorney, Agent, or Firm*—Townsend and Townsend and Crew LLP

(57) ABSTRACT

A processor includes multiple processor core units, each including a processor core and a cache memory. Victim lines evicted from a first processor core unit's cache may be stored in another processor core unit's cache, rather than written back to system memory. If the victim line is later requested by the first processor core unit, the victim line is retrieved from the other processor core unit's cache. The processor has low latency data transfers between processor core units. The processor transfers victim lines directly between processor core units' caches or utilizes a victim cache to temporarily store victim lines while searching for their destinations. The processor evaluates cache priority rules to determine whether victim lines are discarded, written back to system memory, or stored in other processor core units' caches. Cache priority rules can be based on cache coherency data, load balancing schemes, and architectural characteristics of the processor.

11 Claims, 9 Drawing Sheets

HORIZONTALLY-SHARED CACHE VICTIMS IN MULTIPLE CORE PROCESSORS

CROSS-REFERENCES TO RELATED APPLICATIONS

This application claims the benefit under 35 U.S.C. 119(e) of U.S. Provisional Patent Application No. 60/829,099, filed Oct. 11, 2006, which is herein incorporated by reference in its entirety for all purposes.

BACKGROUND OF THE INVENTION

The invention relates to the field of microprocessor architectures. Microprocessor designers are continually striving to improve microprocessor performance, designing microprocessor architectures that provide, for example, increased computational abilities, increased operating speeds, reduced power consumption, and/or reduced cost. With many previous microprocessor architectures, it has become increasingly difficult to improve microprocessor performance by increasing their operating frequency. As a result, many newer microprocessor architectures have focused on parallel processing to improve performance.

One parallel processing technique employed in microprocessor architectures is multiple processing cores. This technique utilizes multiple independent processors, referred to as cores, operating in parallel to execute software applications. Two or more processing cores may be implemented within the same integrated circuit die, within multiple integrated circuit dies integrated within the same integrated circuit package, or a combination of these implementations. Typically, multiple processing cores share a common interface and may share other peripheral resources.

Microprocessors typically operate much faster than typical memory interfaces. Additionally, many types of electronic memory have a relatively long latency time period between the time when a processor requests data and the time the requested data is received. To minimize the time a microprocessor spends idle and waiting for data, many microprocessors use cache memory to store a temporary copy of program instructions and data. Typical cache memory is highly integrated with a microprocessor, often within the same integrated circuit die. As a result, cache memory is very fast and has low latency. However, this tight integration limits the size of the cache memory.

Typical microprocessors employ a multiple-level cache architecture. A processor typically includes a first level of cache memory, referred to as L1 cache, which is very tightly integrated with the processor to provide high speed and very low latency, but is relatively small. A processor also typically includes a second level of cache memory, referred to as L2 cache, which is less tightly integrated with the processor, thereby operating at slower speed and higher latency, but having a larger capacity. Some processors have additional cache levels as well. Typically, data most likely to be used by a processor is preferably stored in the L1 cache, with the L2 cache and other optional caches acting as a fall-back for additional data.

The use of multiple-level cache architectures improves performance, but also consumes a large number of transistors, and hence increases the cost and power consumption of the microprocessor. These drawbacks are exacerbated in multiple core architectures, which, in addition to requiring large numbers of transistors for each core, may also require separate L1 and/or L2 caches for each core.

It is therefore desirable for a multiple core processor to utilize cache memory efficiently to provide improved performance and reduced power consumption for a given amount of chip area. This allows for multiple core processors to provide improved performance for the same cost or to provide the same performance for a reduced cost as prior types of architectures.

BRIEF SUMMARY OF THE INVENTION

An embodiment of the invention includes a processor with multiple processor core units, each including a processor core adapted to process data and a cache memory for storing data potentially needed by its associated processing core. When a first processor core unit's cache memory is full and some cache data needs to be evicted from the cache to make room for additional data, this evicted data, referred to as a victim line, may optionally be stored in the cache memory of another processor core unit, rather than being written back to system memory or a higher-level cache memory, if any is present. If the victim line is later requested by the first processor core unit, the victim line is retrieved from the cache memory of the other processor core unit, rather than being retrieved from system memory. Embodiments of the processor are adapted to have relatively low latency when transferring data between processor core units. Embodiments of the processor may eliminate or have substantially reduced amounts of higher level cache memory, or may include higher level cache memory to substantially improve performance over prior processors.

In an embodiment, the processor includes logic adapted to transfer victim lines directly from a source processor core unit to a destination processor core unit. In another embodiment, victim lines from one or more processor core units are temporarily stored in a victim cache. The victim cache includes logic adapted to facilitate the storage of victim lines in cache memories of other processor core units. Either embodiment can include logic adapted to evaluate cache priority rules to determine whether victim lines are discarded, written back to system memory or a higher level cache memory, if present, or stored in cache memories of other processor core units. Embodiments of cache priority rules can be based on cache coherency data of victim lines and potential candidate lines in destination processor core units, load balancing schemes, and architectural characteristics of the processor.

BRIEF DESCRIPTION OF THE DRAWINGS

The invention will be described with reference to the drawings, in which.

DETAILED DESCRIPTION OF THE INVENTION

Figure 1A:
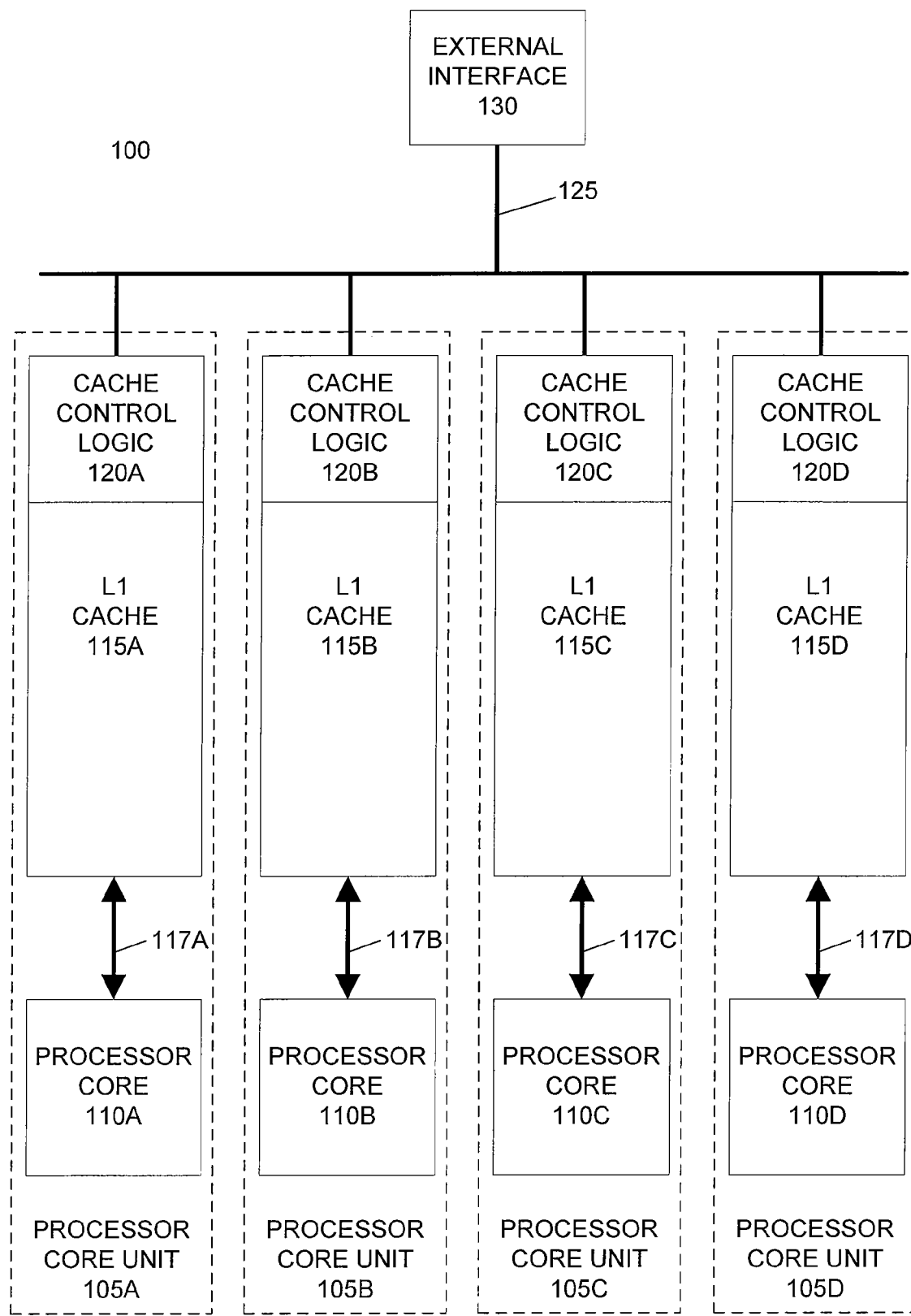
FIGS. 1A and 1B illustrate example processors according to an embodiment of the invention.
Figure 1B:
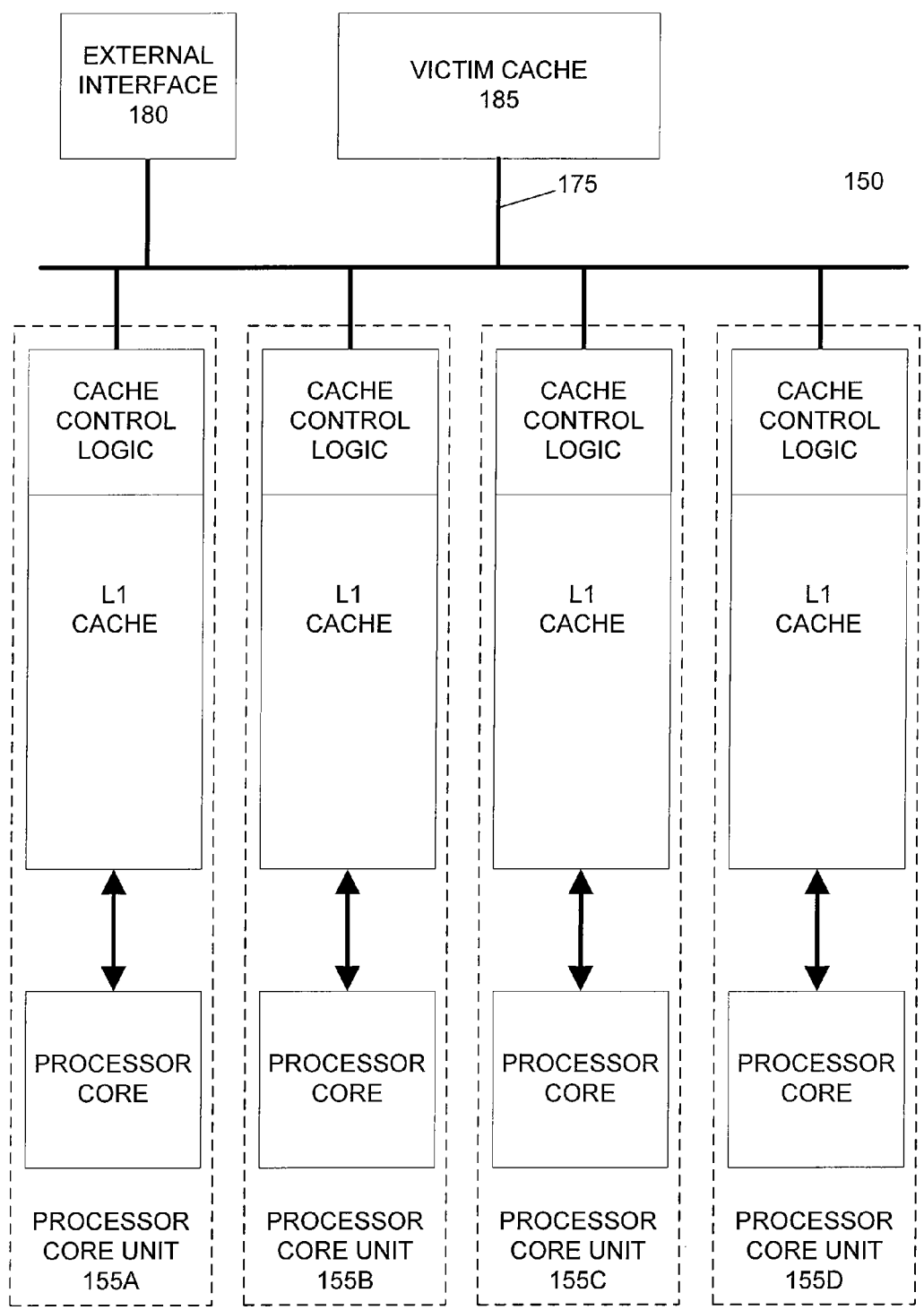

FIGS. 1A and 1B illustrate example processors according to an embodiment of the invention. As discussed in detail below, the example processors of FIGS. 1A and 1B can elect to use the cache memory associated with one processor core to store data for a different processor core. This enables processor cores to use cache memory more efficiently, thereby improving performance and reducing cost and power consumption. In this application, information stored in cache memory is referred to generally as data and may be comprised of program data, program instructions, address translation data, and/or any other information used in the operation of processor cores.

FIG. 1A illustrates a first example processor 100 according to an embodiment of the invention. Embodiments of example processor 100 include two or more processor core units 105, such as processor core units 105A, 105B, 105B, and 105D. Each of the processor core units 105 includes at least one processor core. For example, processor core units 105A, 105B, 105C, and 105D include processor cores 110A, 110B, 110C, and 110D, respectively.

Processor cores 110 are capable of performing one or more information processing functions on data. Processor cores 110 may perform a fixed sequence of functions or be capable of performing a flexible sequence of functions in response to program instructions. Each of the processor cores 110 may be configured according to RISC and/or CISC architectures and may process scalar or vector data types using SISD or SIMD instructions. Processor cores 110 may include general purpose and specialized register files and execution units configured to perform logic functions, arithmetic or other mathematical functions, data manipulation functions, or any other types of functions capable of being implemented using digital logic circuits. Each of the processor cores 110 may have identical functions and capabilities or may have different functions and capabilities specialized for different purposes.

In an embodiment, processor core units 105 are connected via at least one data bus 125. Data bus 125 facilitates the transfer of instructions and/or data between processor core units 105. Data bus 125 may have any type of bus configuration or topology known in the art and may be comprised of a single bus or multiple buses. In an embodiment, processor 100 is implemented within an integrated circuit package. Further embodiments of processor 100 may be implemented either within a single integrated circuit die within the integrated circuit package or within multiple integrated circuit dies within a single integrated circuit package. In these embodiments, the data bus 125 also facilitates data communications between processor core units 105 and external interface 130. External interface 130 enables processor core units 105 to communicate with computer system components outside of the integrated circuit package.

Each of the processor core units include one or more levels of cache memory to temporarily store data potentially needed by its associated processor core. The data stored in the cache memory can include program instructions and/or program data. Typical cache memories are organized into cache lines. Each cache line stores a copy of data corresponding with one or more virtual or physical memory addresses. Each cache line also stores additional data used to manage the cache line, such as cache line tag data used to identify the memory address associated with a cache line and cache coherency data used to synchronize the data in the cache line with other caches and/or with the computer system's memory.

Example processor core units 105A, 105B, 105C, and 105D include L1 cache units 115A, 115B, 115C, and 115D, respectively. L1 cache units 115 are connected with their associated processor cores 110 via data buses 117A, 117B, 117C, and 117D. Although shown for clarity as a single bus, each of the data buses 117 may be comprised of one or more data buses between an L1 cache unit and its associated processor core. Embodiments of L1 cache units 115 may also include cache control logic units 120 to facilitate the transfer of data to and from their respective L1 cache units. Cache units 115 may be fully associative, set associative with two or more ways, or direct mapped. For clarity, each of the L1 cache units 115 is illustrated as a single cache memory capable of storing any type of data potentially required by the processor core unit; however, embodiments of the invention can include separate L1 cache units in each processor core unit for storing different types of data separately, such as program instruction caches, program data caches, and translation lookaside buffer data caches.

In an embodiment, each of the L1 cache units 115 can store a limited number of cache lines. When the capacity of one L1 cache unit is exceeded, one of the cache lines is removed from the L1 cache to make room for a new cache line. The removed cache line is referred to as a victim line. Previously, processors discard victim lines, write victim lines into a different cache level, and/or write victim lines back into the system memory.

In embodiments of the invention, data potentially required by one processor core may be stored if necessary in the cache memory associated with a different processor core. In an embodiment of processor 100, a victim line evicted from one L1 cache unit associated with one processor core, referred to as a source processor core, may be stored in a L1 cache unit associated with another processor core, referred to as a destination processor core. For example, a victim line evicted from L1 cache unit 115a may be transferred via data bus 125 and stored L1 cache unit 115B, 115C, or 115D. The terms source and destination refer to the roles played by processor core units with respect to a victim line. Each processor core unit may act as both a source and destination as needed.

In an embodiment of processor 100, the cache control logic units 120 identify victim lines from their respective L1 cache units 115; locate one or more available cache lines in one or more other L1 cache units; select a destination cache line in another L1 cache unit for each victim line; and facilitate the transfer and storage of victim lines to their destination cache lines. Cache control logic units 120 may perform some or all of these tasks asynchronously with the operations of their associated processor cores.

Following the storage of a victim line in a destination cache line associated with the L1 cache unit of a destination processor core, the data of the victim line will still be accessible to the source processor core when needed. In an embodiment of processor 100, if a source processor core attempts to access data previously evicted from its associated L1 cache unit, a cache miss will occur. In response to the cache miss, the cache control logic unit of the source processor core will send a data request message, referred to as a cache snoop, to the other processor core units to determine if any of their L1 cache units contain the requested data. The cache snoop may include information identifying the requested data, such as a memory address and/or cache tag data associated with the data. If the requested data has been stored in a cache memory of at least one other processor core unit, the requested data will be transferred back to the source processor core unit via bus 125.

In a further embodiment, the requested data may be stored once again in the source processor core's L1 cache unit, potentially evicting other cache lines.

For example, processor core 110A has a full L1 cache unit 115A. Upon writing additional data to L1 cache unit 115A, a first victim line will be evicted from L1 cache unit 115A. For the purposes of explanation, processor core unit 105A is referred to as the source processor core unit of the first victim line. The first victim line may be transferred via data bus 125 and stored L1 cache units 115B, 115C, or 115D. For example, the first victim line may be stored in L1 cache unit 115C, which is part of processor core unit 105C, referred to as the destination processor core unit of the first victim line.

Continuing with this example, if the source processor core 110A later requests data stored in the first victim line, a cache miss will occur with L1 cache unit 115A. In response, cache control logic 120A will issue a cache snoop to processor core units 105B, 105C, and 105D for the requested data. If the first victim line is still stored in the L1 cache unit 115C, destination processor core unit 105C will provide all or a portion of the first victim line to source core processor unit 105A. Typically, the latency time for retrieving data from destination processor core unit and returning it to the source processor core unit will be greater than that for data retrieved from the source processor core unit's own cache memory, but will be substantially less than the latency time required to retrieve data from system memory. Furthermore, the latency time for retrieving data from destination processor core unit and returning it to the source processor core unit will be less than or equal to the latency time required to retrieve this data from another cache memory level, such as L2 cache memory, if any other cache memory levels are present in the system.

It should be noted that embodiments of processor 100 may not store every victim line in the cache memory of another processor core unit. In one embodiment, victim lines will be stored in system memory or a different cache memory level, if any are present, if there are no cache lines available in any other processor core units. In a further embodiment, victim lines may be discarded if the victim line is marked as invalid according to a cache coherency scheme or if an optional higher-level cache memory includes a valid copy of the victim line. Another embodiment uses a cache priority policy to decide whether to store the victim line in another processor core unit or write the victim line back to memory. Cache priority policies may utilize cache coherency data of the victim line, cache coherency data of one or more candidate destination cache locations, performance estimation and load balancing data provided by processor core units, and/or caching instructions or prehints provided by a program.

FIG. 1B illustrates a second example processor 150 according to an embodiment of the invention. Embodiments of example processor 150 include two or more processor core units 155, such as processor core units 155A, 155B, 155C, and 155D. Processor core units 155 are similar to processor core units 105 discussed above. Additionally, processor core units 155 are connected via at least one data bus 175 with each other and with external interface 180. Data bus 175 is similar to data bus 125 and external interface 180 is similar to external interface 130.

Like processor 100, example processor 150 may store victim lines in the cache memory units of other processor core units. Unlike processor 100, embodiments of example processor 150 also include a victim cache 185 to temporarily store victim lines. Victim cache 185 may be a relatively small, fully associative cache or a larger, set associative cache with two or more ways. An embodiment of victim cache 185 receives victim lines evicted from source processor cores and stores these victim lines while searching for a destination location in another processor core unit. In an embodiment, the victim cache 185 may include control logic to issue cache snoop requests, evaluate candidate destination locations, and facilitate the transfer of victim lines to a selected destination processor core unit or to system memory or a different cache memory level, if present, if there are no suitable destinations in other processor core units.

Further embodiments of processors 100 and 150 can include additional components that are omitted for clarity from FIGS. 1A and 1B. Example additional components can include integrated memory controllers, peripheral controllers, digital signal processors, audio and video processors, network or high speed data interfaces, analog to digital and digital to analog converters, and any other components known in the art for use with microprocessors, microcontrollers, system on a chip (SoC), embedded processors, or application specific integrated circuits (ASICs).

Figure 2:
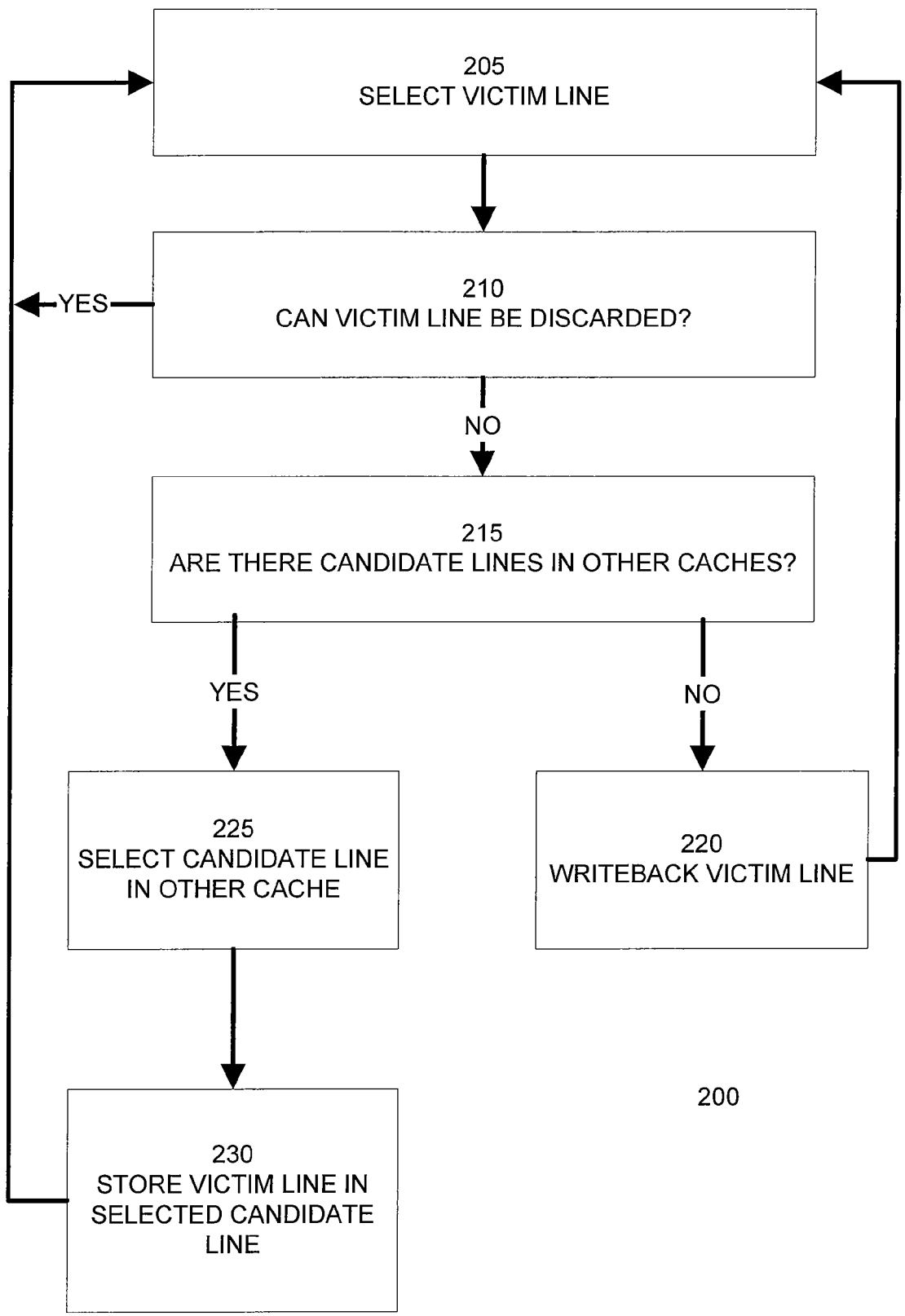
FIG. 2 illustrates a method of operation of a processor according to an embodiment of the invention.

FIG. 2 illustrates a method 200 of operation of a processor according to an embodiment of the invention. Embodiments of the invention can implement method 200 using digital logic including cache control logic of one or more processor core units, using control logic included in one or more processor cores, control logic associated with a victim cache, control logic associated with one or more data buses, or any combination thereof. Processors 100, 150, and 400 (discussed below) can implement embodiments of method 200 as well.

Step 205 selects a victim cache line to evict from a cache memory of a processor core unit. In an embodiment, step 205 is initiated when the processor attempts to store new data in a cache memory that is full. Victim cache lines can be selected using any cache replacement scheme known in the art, including least recently used (LRU) replacements schemes, cache coherency schemes, and cache prehint replacement schemes.

Step 210 determines whether the selected victim line can be discarded. In an embodiment, victim lines can be discarded in accordance with a cache coherency policy. For example, a cache using the MESI cache coherency scheme includes cache coherency status data bits indicating if each cache line is modified (M), exclusively stored in that cache memory (E), shared in multiple cache memories (S), or invalid (I). In this example, a selected victim line can be discarded if marked invalid (I=1). In a further example, a selected victim line can also be discarded if the selected victim line is marked as shared (S=1). In this example, the processor may have to perform a cache snoop operation on one or more levels of cache memory within processor core units or shared by processor core units to confirm that the selected victim lines cache coherency data is correct and the selected victim line is still shared.

If step 210 determines that the selected victim line can be discarded, the selected victim line can be overwritten in the cache by new data. Method 200 returns to step 205 following step 210 to await the need to select another victim line.

Conversely, if step 210 determines that the selected victim line cannot be discarded, method 200 proceeds to step 215. Step 215 determines if there are any cache locations available in other processor core units for storing the selected victim line. In an embodiment, the source processor core unit initiates a cache snoop or other query to one or more other potential destination processor core units. In another embodiment, control logic associated with a victim cache initiates the cache snoop or other query to potential destination processor core units. The cache snoop may be communicated to two or more potential destination processor core units simultaneously using a broadcast messaging protocol or to individual potential destination processor core units using a point-to-point messaging protocol.

One or more processor core units respond to the cache snoop by each providing a message indicating that it has at least one available cache location or that it does not have any available cache locations. Each available cache location is referred to as a candidate line. In a further embodiment, these response messages may include cache coherency information about candidate lines to be used to select a candidate line.

Based on the response messages from other processor core units, step 215 may determine that there are no candidate lines available for the selected victim line. This may be true if the cache memories of other processor core units are full with other valid data. In a further embodiment, this may also be true if the data already stored in the cache memories of other processor core units has higher priorities than the selected victim line. In an embodiment, a set of cache priority rules are used to evaluate the priorities of the selected victim line and one or more candidate lines. The cache priority rules can use cache coherency data of the victim line and candidate lines, load balancing data provided by processor core units, and/or caching instructions or prehints provided by programs. Table 1, listed below, illustrates an example set of cache priority rules that utilize cache coherency data.

available candidate lines, an embodiment of step 225 uses cache priority rules, load balancing rules, or architectural considerations to select one candidate line to store the selected victim line.

For example, cache priority rules may specify that candidate lines marked as invalid according to a cache coherency scheme be selected over candidate lines marked as shared, as these candidate lines are not currently used by the destination processor core unit. In another example, step 225 may use a round-robin or other load balancing selection scheme so that victim lines are evenly distributed among all of the processor core units in the processor when possible. In another example, architectural considerations can be used to select a candidate line for storing the victim line that maximizes processor performance. Architectural considerations can include differences in speed or latency of communications between different processor core units or differences in the cache sizes of different processor core units.

After selecting one candidate line, step 230 stores the victim line in the selected candidate line, overwriting the data previously stored in the selected candidate line. Following step 230, method 200 returns to step 205 to await the need to select another victim line.

Table 1 illustrates example cache priority rules utilizing MESI cache coherency data and suitable for use with embodiments of the invention.

TABLE 1

Example MESI Cache Priority Rules

| Victim Line Status | Candidate Line Status | Action |
| --- | --- | --- |
| Modified (M = 1) | Shared (S = 1), Invalid (I = 1) | Overwrite candidate line with victim line. If candidate line is shared (S = 1), verify candidate line status before overwriting. |
| | Modified (M = 1), Exclusive (E = 1) | Store victim line in system memory or in other cache level, if any. |
| Exclusive (E = 1) | Shared (S = 1), Invalid (I = 1) | Overwrite candidate line with victim line. If candidate line is shared (S = 1), verify candidate line status before overwriting. |
| | Modified (M = 1), Exclusive (E = 1) | Store victim line in system memory or in other cache level, if any. |
| Shared (S = 1) | Invalid (I = 1) | Overwrite candidate line with victim line. If candidate line is shared (S = 1), verify candidate line status before overwriting. |
| | Modified (M = 1), Exclusive (E = 1), Shared (S = 1) | Store victim line in system memory or in other cache level, if any. |
| Invalid (I = 1) | Any | Discard victim line. |

If step 215 determines that there are no candidate lines suitable for storing the selected victim line, then step 220 writes the selected victim line to system memory or a different cache memory level, if present. Following step 220, method 200 returns to step 205 to await the need to select another victim line.

Conversely, if step 215 determines that there are one or more candidate lines suitable for storing the selected victim line, then step 225 selects one candidate line as the destination for storing the selected victim. If there is more than one Similar cache priority rules can utilize cache coherency data for MSI, MESI, MOSI, MOESI, or any other cache coherency scheme known in the art, as well as performance and load balancing data provided by processor core units, architectural considerations that minimize power consumption and/or maximize operating speed, and/or caching instructions or prehints provided by programs.

Figure 3:
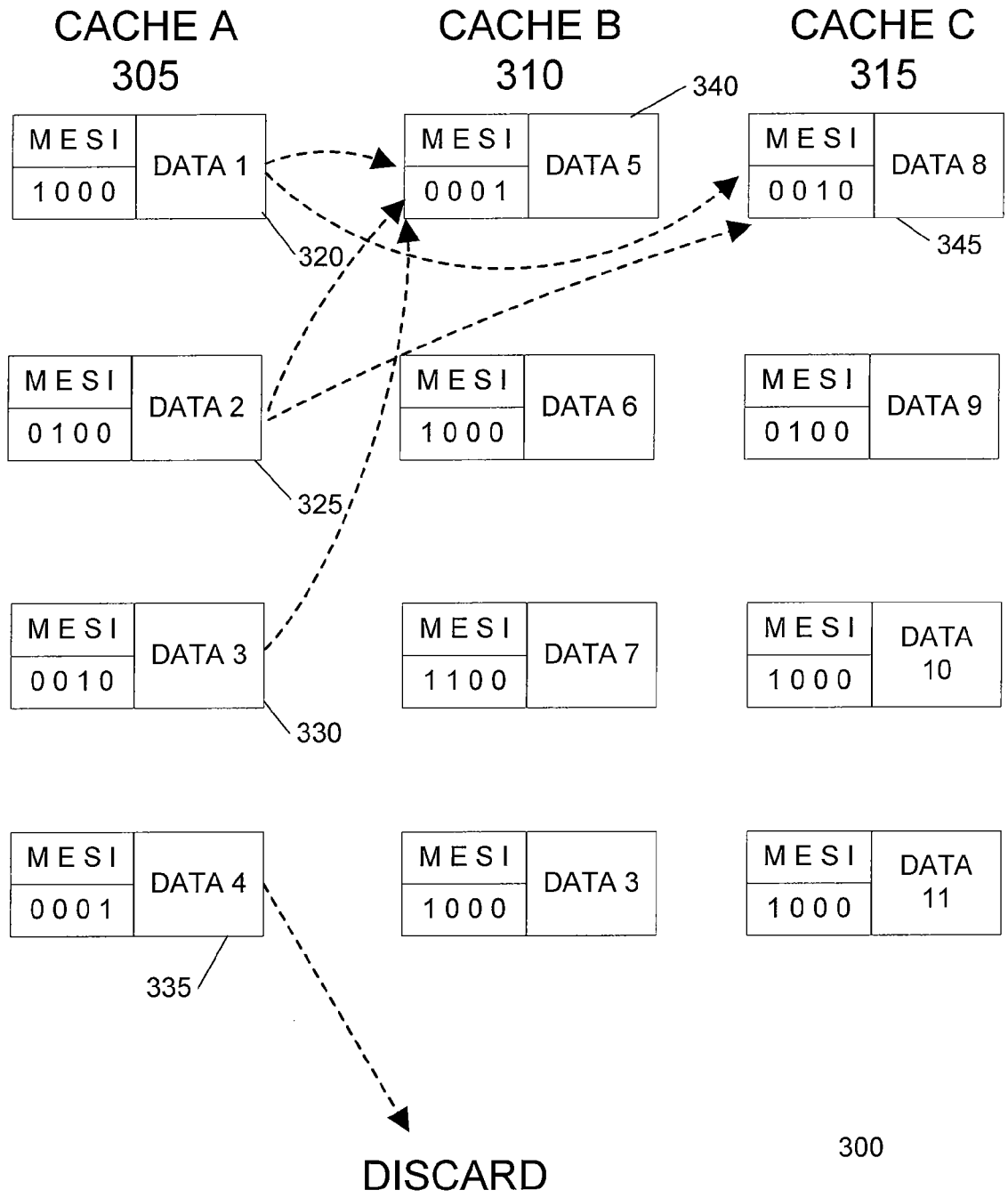
FIG. 3 illustrates an example application of cache priority rules according to an embodiment of the invention.

FIG. 3 illustrates an example application 300 of the cache priority rules of table 1 according to an embodiment of the invention. Example 300 illustrates three cache memories, 305, 310, and 315, each of which is associated with a different processor core unit. Cache A 305 includes cache lines 320, 325, 330, and 335. Cache line 320 includes data 1 and is marked as modified (M=1). If cache line 320 is selected as a victim line, the example cache priority rules of table 1 specify that this cache line 320 can overwrite a cache line marked as shared or invalid in another cache memory. In this example, cache line 340 of cache B 310 and cache line 345 of cache C 315 are marked as invalid and shared, respectively, and are suitable candidates for storing the contents of cache line 320.

Similarly, cache line 325 includes data 2 and is marked as exclusive (E=1). If cache line 325 is selected as a victim line, the example cache priority rules of table 1 specify that this cache line 325 can overwrite a cache line marked as shared or invalid in another cache memory, such as cache line 340 of cache B 310 and cache line 345 of cache C 315.

Cache line 330 includes data 3 and is marked as shared (S=1). If cache line 330 is selected as a victim line, the example cache priority rules of table 1 specify that this cache line 330 can overwrite a cache line marked as invalid in another cache memory, such as cache line 340 of cache B 310.

In some embodiments, when a shared cache line is overwritten, the processor determines if there is only one remaining copy of that shared cache line in another cache. In an embodiment, this determination is performed using one or more cache snoop operations or other cache query mechanisms to identify one or more cache lines in other cache memories corresponding with an overwritten shared cache line. If there is only one remaining copy of a shared cache line, the processor changes the cache coherency data of the last copy of the cache line to exclusive (E=1). This prevents the last copy of a cache line from being inadvertently overwritten, which could cause a cache miss.

Cache line 335 includes data 4 and is marked as invalid (I=1). If cache line 335 is selected as a victim line, the example cache priority rules of table 1 specify that this cache line 335 should be discarded.

It should be noted that embodiments of the invention preserve cache coherency data of victim lines when they are stored in different cache memories. For example, cache line 320 is marked as modified (M=1). If cache line 320 is evicted from cache A 305 and stored in cache B 310, overwriting the contents of cache line 340, cache line 340 will be marked as modified (M=1).

Embodiments of the invention, such as processors 100 and 150, may be implemented without any L2 or higher-level cache memory. In these embodiments, the ability for one processor core unit to store its victim lines in the cache memory of another processor core unit reduces or eliminates the performance penalty arising from omitting L2 cache memory for the processor cores. This allows example processors 100 and 150 to have performance similar to prior processors that include L2 cache memory, at a reduced cost and power consumption.

Figure 4:
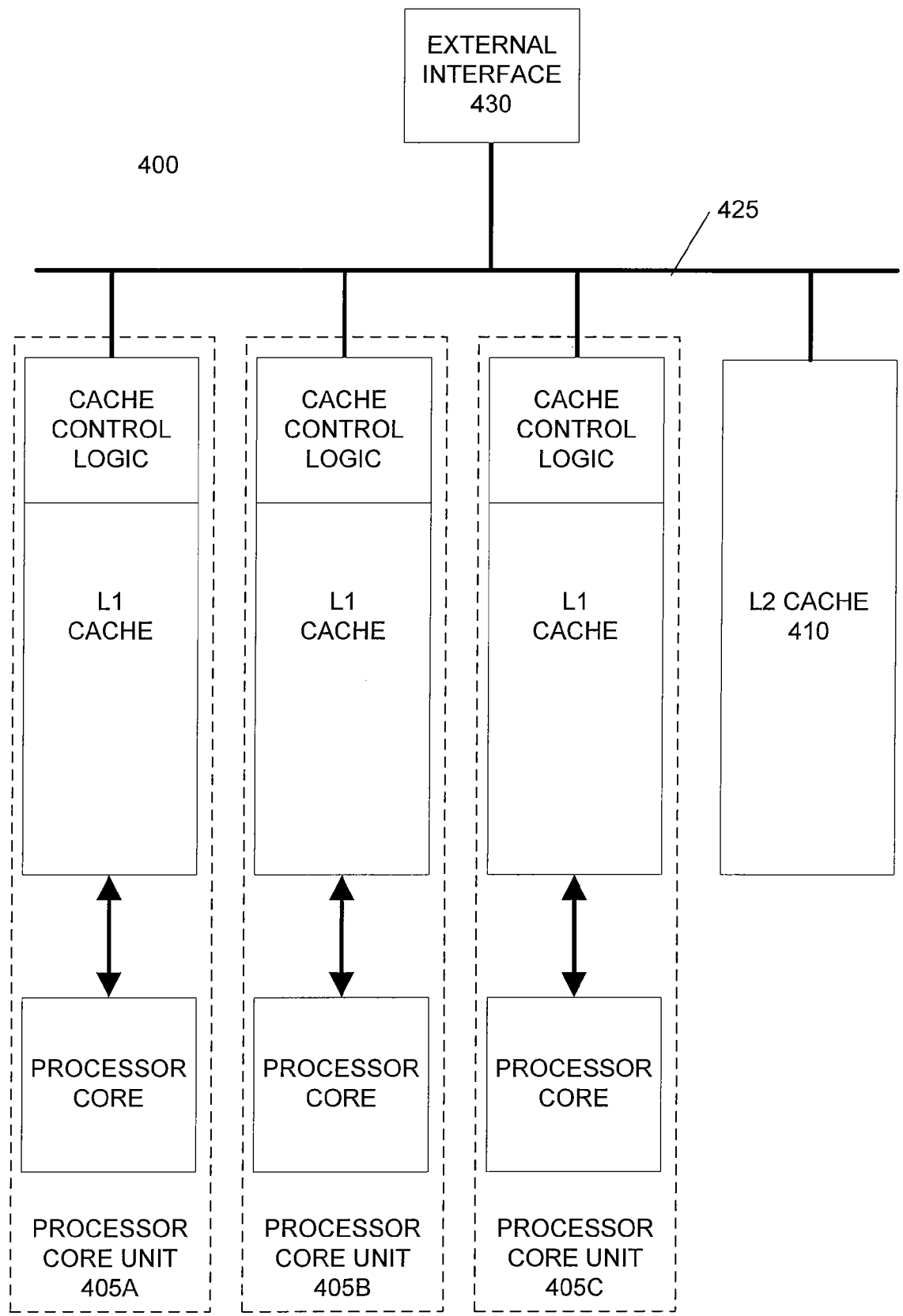
FIG. 4 illustrates another example processor according to an embodiment of the invention.

FIG. 4 illustrates another example processor 400 according to an embodiment of the invention. Example processor 400 includes an L2 cache memory to further improve performance. Embodiments of example processor 400 include two or more processor core units 405, such as processor core units 405A, 4055B, and 405C. Processor core units 405 are similar to processor core units 105 discussed above. Additionally, processor core units 405 are connected via at least one data bus 425 with each other and with external interface 430. Data bus 425 is similar to data bus 125 and external interface 430 is similar to external interface 130.

Unlike processor 100, embodiments of example processor 400 also include a L2 cache memory 410. In an embodiment, L2 cache memory 410 is connected to processor core units 405 via data bus 425. In this embodiment, L2 cache memory 410 is shared with two or more of the processor core units 405. L2 cache memory 410 can store data potentially needed by one or more of the processor core units 405. L2 cache memory 410 can also store victim lines evicted from cache memories of the processor core units 405. L2 cache memory 410 can be the same size and have the same type of associativity as the L1 cache memories of the processor core units or have a different size and different type of associativity as the L1 cache memories of the processor core units. For processor 400, cache priority rules can incorporate information about L2 cache memory 410, such as whether L2 cache memory 410 is full or the relative latency of L2 cache memory 410, to determine whether to store a victim line in a L1 cache of another processor core unit or within the L2 cache memory 410.

Example processor 400 may provide improved performance over prior designs at a similar cost. By allowing processor core units to share L1 cache memory units, the size of each L1 cache memory unit and the L2 cache memory can be smaller than that required by prior designs and yet processor 400 can still provide the same or better performance.

Figure 5:
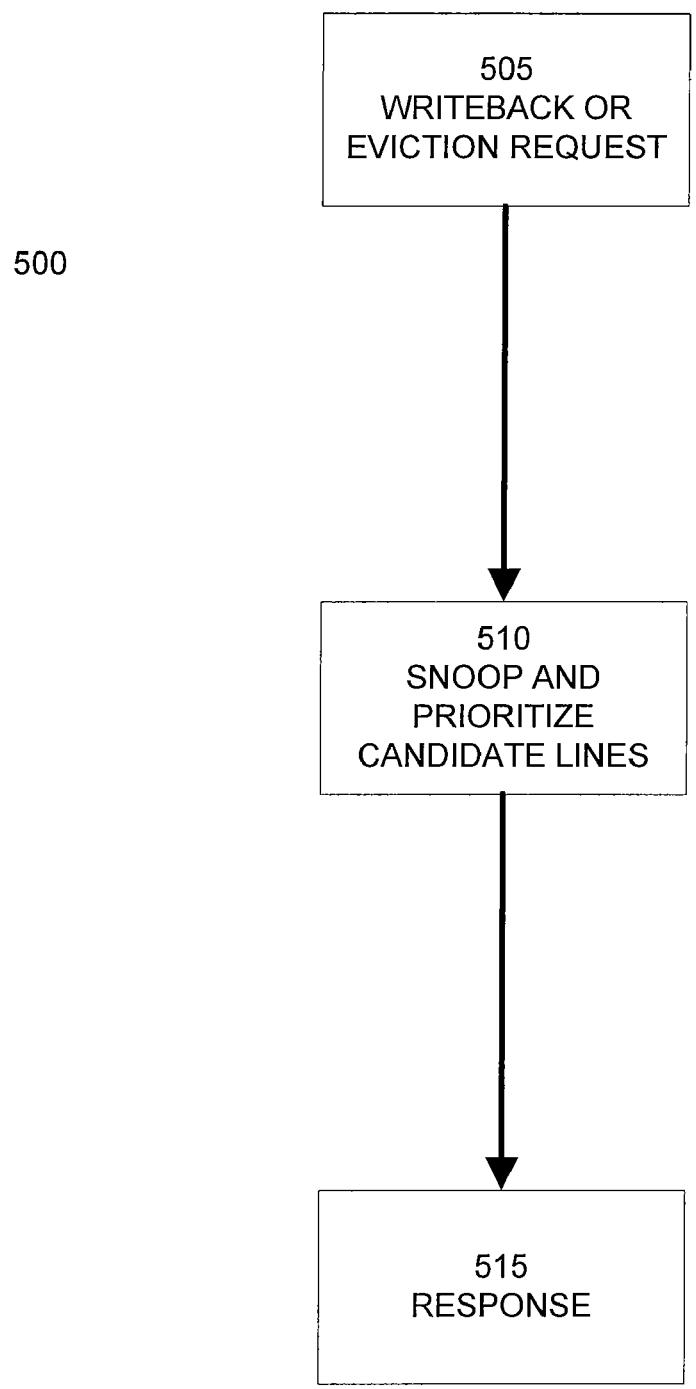
FIG. 5 illustrates the logic of an example cache snooping system according to an embodiment of the invention.

FIG. 5 illustrates the logic 500 of an example cache snooping system according to an embodiment of the invention. Logic 500 includes a first stage 505 for receiving writeback or eviction requests for cache lines. A second stage 510 issues cache snoops or other queries about cache memories in other processor core units and optionally in other levels of cache memory. For example, stage 510 can issue a first set of cache snoops to other processor core units and optionally higher-level cache memory to identify potential candidate lines for a victim line and issue a second cache snoop to determine if a valid copy of the victim line is stored in a higher-level cache memory.

In response to its cache snoops, stage 510 prioritizes potential destinations for the victim line and selects the destination with the highest priority. Potential destinations can include the cache memory of another processor core, a higher-level cache memory, or discarding the victim line (if, for example, a higher-level cache memory has a valid copy of the victim line). Stage 510 can evaluate cache priority rules as described above to prioritize potential destinations of the victim line.

Stage 515 sends the victim line to the selected destination, which can be a candidate line in another processor core unit's cache memory, a candidate line in a higher-level cache memory (if any is present), or discarding the victim line.

Embodiments of logic 500 can be implemented in a pipelined manner, such that multiple victim lines are processed by different stages in parallel. Furthermore, logic 500 can be further sub-divided into additional stages as necessary. For example stage 510 could be sub-divided into three different pipeline stages for issuing cache snoops, receiving cache snoop responses, and prioritizing cache snoop responses to select a destination for the victim line.

Figure 6:
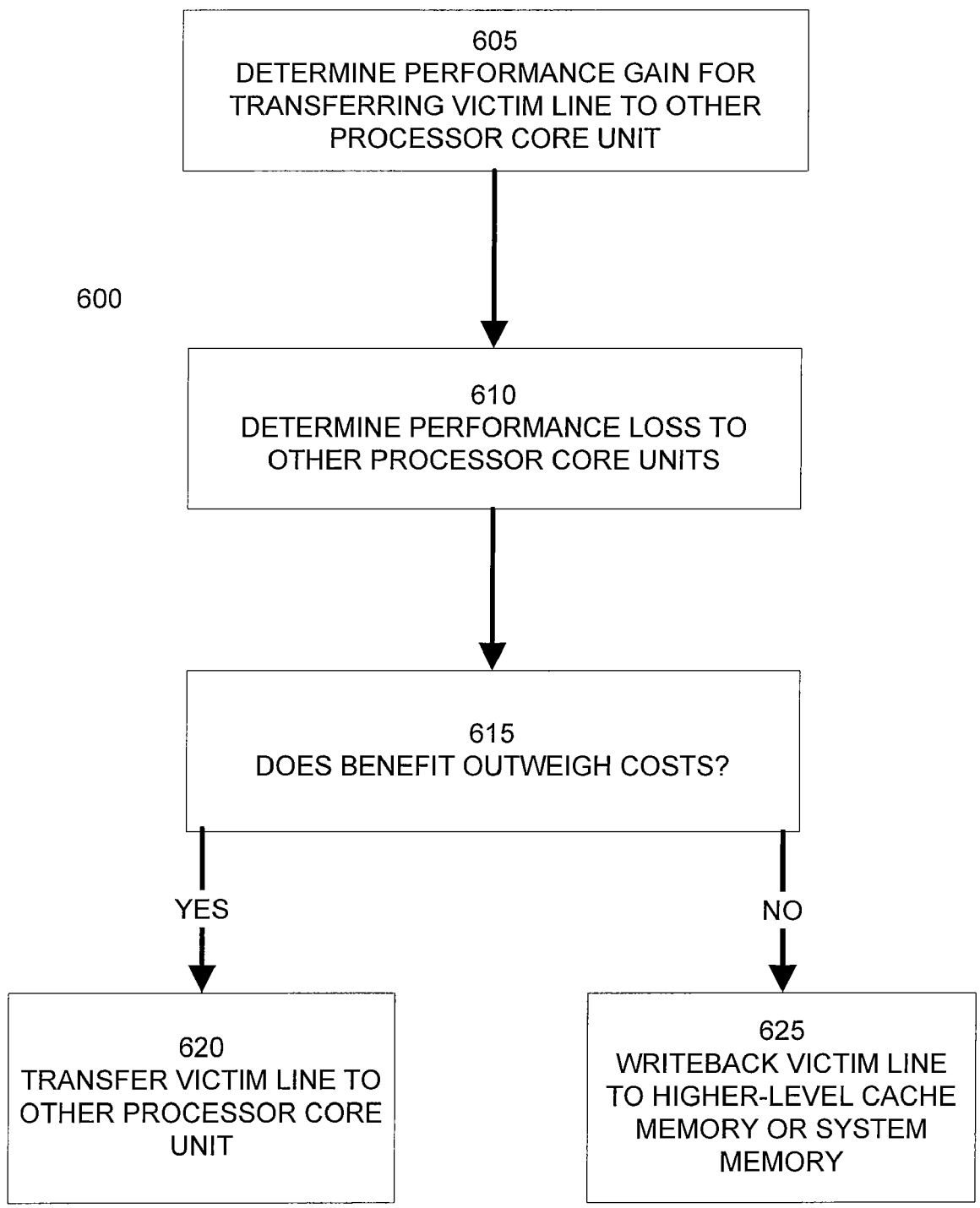
FIG. 6 illustrates a method for evaluating candidate lines according to an embodiment of the invention.

FIG. 6 illustrates a method 600 for evaluating candidate lines according to an embodiment of the invention. Method 600 can be used to select a candidate line for storing a victim line or for selecting an alternative destination for the victim line, such as an optional higher-level cache memory, system memory, or discarding the victim line.

Step 605 determines a performance gain for a source processor core unit in response to transferring its victim line to another processor core unit's cache memory. In an embodiment, the performance gain of the source processor core unit is estimated by analogizing the transfer of the victim line to an increase in size of the source processor core unit's cache memory by one additional cache line. Techniques for estimating the performance gain of a processor due to an incremental increase in cache size are well known in the art. In a further embodiment, this estimate may be modified to take into account the increased latency when accessing data stored by another processor core unit.

Step 610 determines the performance losses for one or more potential destination processor core units due to storing the victim line for the source processor core unit. In an embodiment, the performance loss of a potential destination processor core unit is estimated by analogizing the transfer of the victim line to a decrease in size of the destination processor core unit's cache memory by one cache line. In a further embodiment, each processor core unit performs this estimation of performance loss for itself and provides the results of this estimation in response to a cache snoop from a source processor core unit.

Step 615 determines if the performance gained by the source processor core unit for storing the victim line in another processor core unit outweigh the performance loss to the destination processor core unit. If the performance gain outweighs the performance loss, then step 620 transfers the victim line to a selected destination processor core unit for storage in its cache memory. In an embodiment, if there are multiple potential destination processor core units that have performance losses less than the performance gain, step 615 selects a destination processor core to maximize the performance gain, such as the destination processor core with the smallest performance loss. Conversely, step 625 stores the victim line in an optional higher-level cache memory, system memory, or discards if the victim line if the performance gain of the source processor core unit does not outweigh the performance loss of the destination processor core unit.

Embodiments of method 600 can be performed in conjunction with or instead of cache priority rules. For example, method 600 can used only to evaluate performance gains and losses associated with victim and candidate lines having specific cache coherency data values. Alternatively, method 600 can be used to potentially overwrite candidate cache lines having cache coherency values of M or E with a victim line, if the performance gain to the source processor core is substantial enough.

Figure 7:
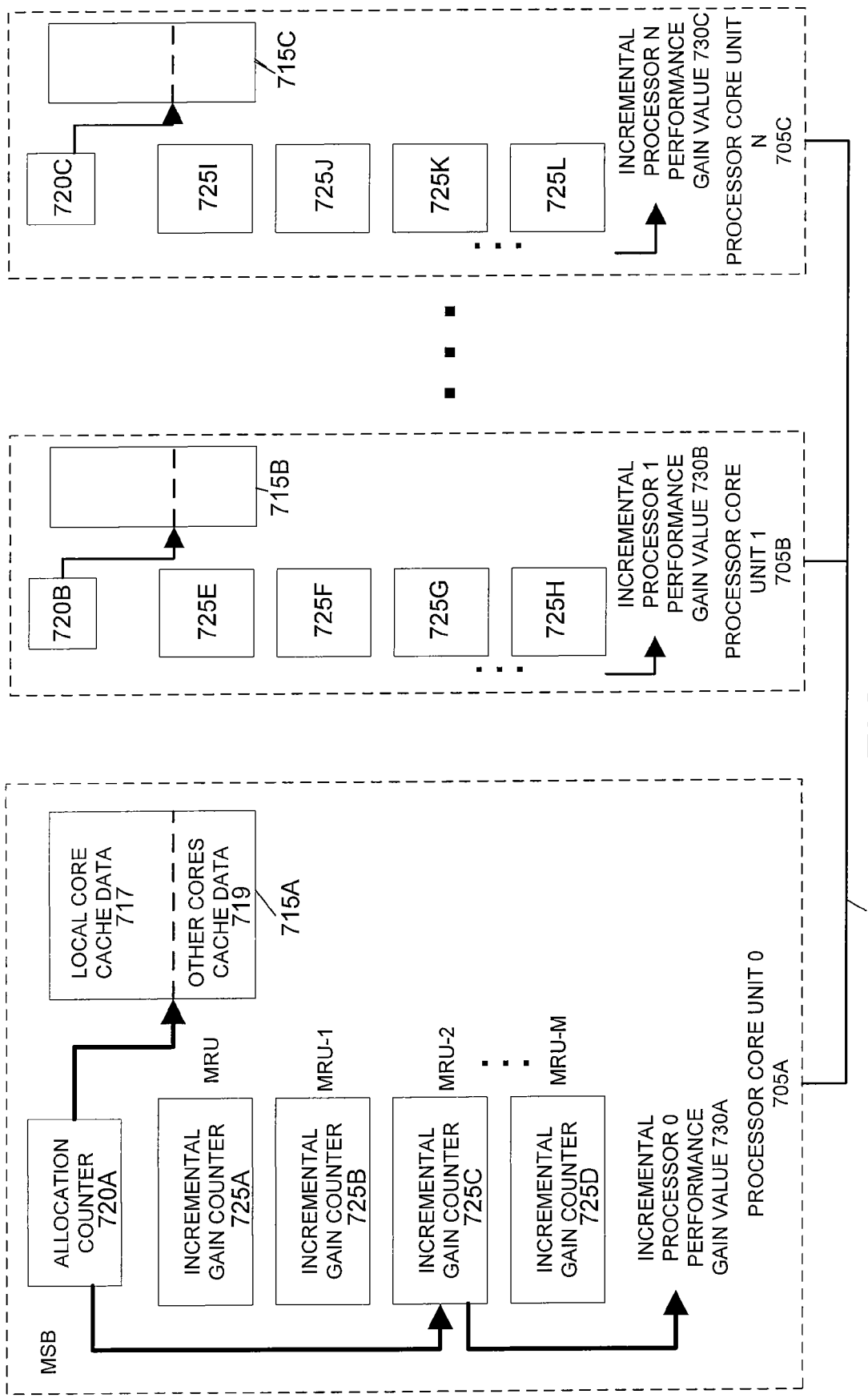
FIG. 7 illustrates a portion of an example processor implementing a method of evaluating cache lines according to an embodiment of the invention.

FIG. 7 illustrates a portion of an example processor 700 implementing method 600 according to an embodiment of the invention. The example processor 700 can include at least two processor core units 705. As shown in FIG. 7, example processor includes N processor core units, where N is any integer greater than 1, including processor core units 0 705A, processor core unit 1 705B, and processor core unit N 705C. The processor core units 705 are connected via one or more interconnect data buses 710. Data bus 710 facilitates the transfer of instructions and/or data between processor core units 705. Data bus 710 may have any type of bus configuration or topology known in the art and may be comprised of a single bus or multiple buses.

Processor core unit 0 705A includes a cache memory 715A. According to an embodiment of the invention, cache memory 715A is dynamically partitioned into two parts: a first part storing cache data for processor core unit 0 705A and a second part storing cache data for other processor core units, such as processor core units 1 705B and N 705C. An allocation counter 720A monitors the size of the first part 717 of the cache memory 715A. When a cache miss occurs and a new cache line is allocated to the first part 717 of the cache memory 715A for the processor core unit 0 705A, the allocation counter 720A is incremented. Thus, the current value of the allocation counter 720 corresponds with the size of the working set of the processor core unit 0 705A. In an embodiment, the range of the allocation counter 720A is the base 2 logarithm of the size of the cache memory 715A.

Processor core unit 0 705A also includes incremental gain counters 725. In an embodiment, processor core unit 0 705A includes one incremental gain counter for each associativity (or way) of the cache memory 715A. For example, if the cache memory 715A is a four-way associative cache memory, then processor core unit 0 705A will include four incremental gain counters 725. In the example processor 700, processor core unit 0 705A includes M incremental gain counters, where M is any integer greater than 1, including incremental gain counters 725A, 725B, 725C, and 725D.

Each of the incremental gain counters 725 corresponds with an index of the cache memory 715. For example, incremental gain counter 725A corresponds with the most recently used (MRU) cache lines, incremental gain counter 725B corresponds with the second most recently used (MRU-1) cache lines, incremental gain counter 725C corresponds with the third most recently used (MRU-2) cache lines, and incremental gain counter 725D corresponds with the least recently used cache lines (MRU-M) cache lines.

In an embodiment, each of the incremental gain counters 725 is incremented every time there is a cache hit in the counters' corresponding cache line. For example, if there is a cache hit in the most recently used cache line of the cache memory 715A, then incremental gain counter 725A is incremented. Thus, the value of each of the incremental gain counters 725 indicates the number of the additional cache hits for a processor if the corresponding cache lines are assigned to the processor. In a further embodiment, the values of the incremental gain counters 725 are periodically scaled by a number between 0 and 1 to give more weight in the incremental gain counters to recent cache hits.

The other processor core units in processor 700, such as processor core units 705B and 705C, include similar cache memories 715B and 715C, allocation counters 720B and 720C, and incremental gain counters 725E to 725L. The size of the cache memories 715 can be the same or different between processor core units.

In further embodiments, incremental gain counters are maintained for each thread of execution or virtual processing elements (VPEs), so that resources can be effectively allocated for multithreaded applications.

In an embodiment, the allocation counters 720 and incremental gain counters 725 are used to determine the destination for a victim cache line. When a victim cache line is to be evicted from cache memory 715A of processor core unit 0 705A, an embodiment of the invention uses all or one or more of the most significant bits of the allocation counter 720A to select one of the incremental gain counters 725 of the processor core unit 705A. For example, if the most significant bits of the allocation counter 720A are "10," then incremental gain counter 725C is selected. The value 730A of the selected incremental gain counter represents the incremental gain in performance associated with the victim cache line.

The incremental performance gain value 730A of the victim line is compared with incremental performance loss values in one or more of the other processor core units to determine the destination of the victim cache line. In an embodiment, the incremental performance gain value 730A is provided to one or more of the other processor core units 705, such as processor core units 1 705B and N 705C. Each of the other candidate destination processor core units use their respective allocation counters and incremental gain counters to determine incremental performance gain values 730B and 730C.

If the incremental performance gain value of the victim cache line 730A is greater than the incremental performance gain values 730B and 730C of one or more candidate destination processor core units, then the victim cache line is stored in the cache memory of one of the candidate destination processor core units. Otherwise, if the incremental performance gain value of the victim cache line 730A is less than all of the incremental performance gain values 730B and 730C of the candidate destination processor core units, then the victim cache line is either discarded or written back to system memory or a different cache level memory, if any.

For example, if incremental performance gain value 730A is greater than the incremental performance gain value 730B, then the victim cache line may be stored in the cache memory of processor core unit 1 705B. Similarly, if incremental performance gain value 730A is greater than the incremental performance gain value 730C, then the victim cache line may be stored in the cache memory of processor core unit N 705C. If incremental performance gain value 730A is less than the incremental performance gain values 730B and 730C, then the victim cache line may be discarded or stored in system memory or a different cache level memory.

Figure 8:
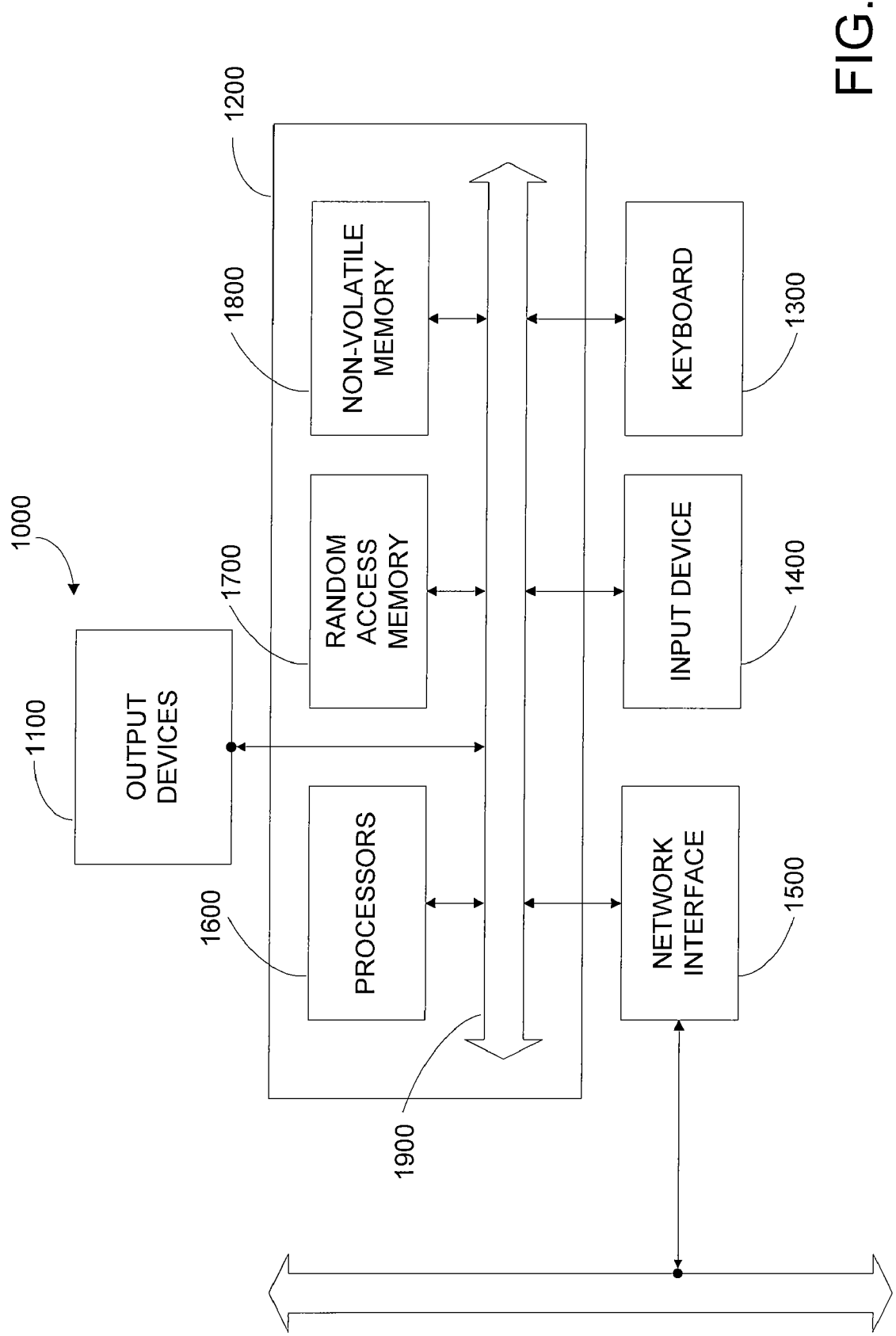
FIG. 8 illustrates an example computer system suitable for use with an embodiment of the invention.

FIG. 8 illustrates an example computer system 1000 suitable for use with embodiments of the invention. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 can include a computer mouse, a trackball, joystick, track pad, graphics tablet, touch screen, microphone, various sensors, and/or other wired or wireless input devices that allow a user or the environment to interact with computer system 1000. Embodiments of network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 can include embodiments of the above described processors, such as processors 100, 150, and 400.

RAM 1700 and non-volatile memory 1800 are examples of tangible media for storage of data, audio/video files, computer programs, applet interpreters or compilers, virtual machines, and embodiments of the herein described invention. For example, embodiments of the above described processors may be represented as human-readable or computer-usable programs and data files that enable the design, description, modeling, simulation, testing, integration, and/or fabrication of integrated circuits and/or computer systems including embodiments of the invention. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the invention can use general-purpose programming or scripting languages, such as C or C++; hardware description languages, such as VHDL or Verilog; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes.

Further embodiments of computer 1200 can include specialized input, output, and communications subsystems for configuring, operating, simulating, testing, and communicating with specialized hardware and software used in the design, testing, and fabrication of integrated circuits.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

It is understood that the apparatus and method described herein may be included in a semiconductor intellectual property core, such as a microprocessor core (e.g. expressed as a hardware description language description or a synthesized netlist) and transformed to hardware in the production of integrated circuits. Additionally, embodiments of the invention may be implemented using combinations of hardware and software, including micro-code suitable for execution within a processor. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A processor comprising:
a first processor core unit including a first processor core capable of processing first data and a first cache memory adapted to store first data;
and a second processor core unit including a second processor core capable of processing second data and a second cache memory adapted to store at least second data;
wherein the processor includes logic adapted to receive a selection of a first victim line from the first cache memory, to identify a candidate line in the second cache memory, and to store the first victim line in the candidate line in the second cache memory, wherein the logic adapted to identify the candidate line in the second cache memory includes logic adapted to evaluate a cache priority rule to select the candidate line from a set of potential candidate lines, wherein the cache priority rule is based on an estimated performance gain of the processor associated with storing the first victim line in the selected candidate line, wherein the logic adapted to evaluate a cache priority rule includes logic adapted to determine at least one estimated performance gain for the first processor core in response to storing the first victim line in at least one of the set of potential candidate lines, wherein the logic adapted to determine at least one estimated performance gain for the first processor core includes a plurality of incremental gain counters, wherein each incremental gain counter is associated with a portion of the first cache memory and adapted to count cache hits in the associated portion of the first cache memory, wherein the logic adapted to determine at least one estimated performance gain for the first processor core includes an allocation counter adapted to output an allocation value based on the size of the portion of the first cache memory storing data associated with the first processor core, wherein the logic adapted to determine at least one estimated performance gain is adapted to use the allocation value to select one of the plurality of incremental gain counters, wherein the value of the selected incremental gain counter represents the estimated performance gain of the first processor core.

2. The processor of claim 1, further comprising:
logic adapted to receive a request for the first victim line from the first processor core;
logic adapted to locate the first victim line in the second cache memory; and
logic adapted to transfer the first victim line from the second cache memory to the first processor core.

3. The processor of claim 1, further comprising:
a victim cache adapted to receive and to store the first victim line from the first processor core unit and including at least a portion of the logic adapted to identify the candidate line and to store the first victim line in the candidate line.

4. The processor of claim 1, wherein at least a portion of the logic adapted to receive the selection of the first victim line, to identify the candidate line, and to store the first victim line in the candidate line is included in the first processor core unit.

5. The processor of claim 1, wherein the cache priority rule is based on at least cache coherency data associated with the first victim line.

6. The processor of claim 1, wherein the cache priority rule is based on at least cache coherency data associated with the set of potential candidate lines.

7. The processor of claim 1, wherein the cache priority rule is based on at least on a load balancing scheme between at least the first and second processor core units.

8. The processor of claim 1, wherein the cache priority rule is based on at least an architectural characteristic of the processor.

9. The processor of claim 1, wherein the logic adapted to evaluate a cache priority rule includes logic adapted to determine at least one estimated performance loss for the second processor core in response to storing the first victim line in at least one of the set of potential candidate lines.

10. A computer system comprising:
a memory device adapted to store data;
an input device adapted to receive input data to the computer system; and
a processor adapted to process the input data and generate output data in response;
wherein the processor comprises:
a first processor core unit including a first processor core capable of processing first data and a first cache memory adapted to store first data; and
a second processor core unit including a second processor core capable of processing second data and a second cache memory adapted to store at least second data;
wherein the processor includes logic adapted to receive a selection of a first victim line from the first cache memory, to identify a candidate line in the second cache memory, and to store the first victim line in the candidate line in the second cache memory, wherein the logic adapted to identify the candidate line in the second cache memory comprises logic adapted to determine at least one estimated performance gain for the first processor core unit in response to storing the first victim line in at least one of the set of potential candidate lines, wherein the logic adapted to determine at least one estimated performance gain for the first processor core unit includes a plurality of incremental gain counters, wherein each incremental gain counter is associated with a portion of the first cache memory and adapted to count cache hits in the associated portion of the first cache memory, wherein the logic adapted to determine at least one estimated performance gain for the first processor core unit includes an allocation counter adapted to output an allocation value based on the size of the portion of the first cache memory storing data associated with the first processor core, wherein the logic adapted to determine at least one estimated performance gain is adapted to use the allocation value to select one of the plurality of incremental gain counters, wherein the value of the selected incremental gain counter represents the estimated performance gain of the first processor core unit.

11. A method of operating a processor in a multi-processor system, the method comprising:
receiving a selection of a first victim line from a first processor core unit, wherein the first victim line is selected for eviction from a first cache memory of the first processor core unit;
determining at least one estimated performance gain from at least one candidate line in at least one cache memory of a second processor core unit;
discarding the first victim line in response to the determination that the estimated performance gain is negative; and
storing the first victim line in the candidate line in response to the determination that the estimated performance gain is positive, wherein determining an estimated performance gain comprises:
determining an estimated performance gain for the first processor core unit from the use of the candidate line in the cache memory of the second processor core unit;
determining an estimated performance loss for the second processor core unit from the use of the candidate line in the cache memory of the second processor core unit by the first processor core unit; and
comparing the estimated performance gain for the first processor core unit with the estimated performance loss for the second processor core unit, wherein determining an estimated performance gain for the first processor core unit comprises selecting a value from one of a plurality of incremental gain counters, wherein the value of the selected incremental gain counter represents the estimated performance gain of the first processor core, wherein the incremental gain counter is selected using at least a portion of a value of an allocation counter specifying the number of cache lines of the first cache memory used by the first processor core unit.

* * * * *